July 8, 1947.   T. S. DONNELLY   2,423,758
ELECTRODE HOLDER
Filed April 10, 1944

INVENTOR.
Thomas S. Donnelly

Patented July 8, 1947

2,423,758

UNITED STATES PATENT OFFICE 2,423,758

ELECTRODE HOLDER

Thomas S. Donnelly, Detroit, Mich.

Application April 10, 1944, Serial No. 530,376

2 Claims. (Cl. 219—8)

My invention relates to a new and useful improvement in an electrode holder adapted for use in arc welding operations. The holder is of the screw or thrust type whereby a pair of clamping members are moved relatively to each other and upon moving into approach serve to engage and clamp an electrode therebetween.

It is an object of the present invention to provide an electrode holder of this class embodying a pair of substantially cup-shaped members adapted for nesting in each other in threaded relation.

It is another object of the present invention to provide an electrode holder of this class embodying a minimum amount of metal so as to reduce the weight of the holder to a minimum.

It is another object of the present invention to provide an electrode holder of this class whereby the conducting cable may be brought into close relation to the clamping jaws which serve to clamp the electrode so that the distance through the clamping mechanism, through which electric current is conducted, is reduced to a minimum.

Another object of the invention is the provision of an electrode holder of this class having one of the clamping portions provided with a rotatable engaging or thrust plate which serves as a wear plate and which, on account of its rotatable mounting, facilitates the threading and unthreading of the parts.

Another object of the invention is the provision in an electrode holder of the class having one part rotatable relatively to the other of an electrode receiving passage for reception of the electrode to be clamped and of another electrode receiving passage whereby the electrode may be used as a lever for unthreading the parts.

Another object of the invention is the provision of an electrode holder of this type provided with a handle and having the metal parts arranged adjacent one end of the handle, leaving a maximum length of the handle free from metal parts and thus avoiding heating of the handle.

Another object of the invention is the provision of an electrode holder of this class which will be economical of manufacture, durable, light, compact, easily operated and highly efficient in use.

Other objects will appear hereinafter.

It is recognized that various changes and modifications may be made in the detail of structure illustrated and it is intended that such variations and modifications shall be encompassed within the scope of the claims which form a part hereof.

Forming a part of this application are drawings in which.

Figure 1:
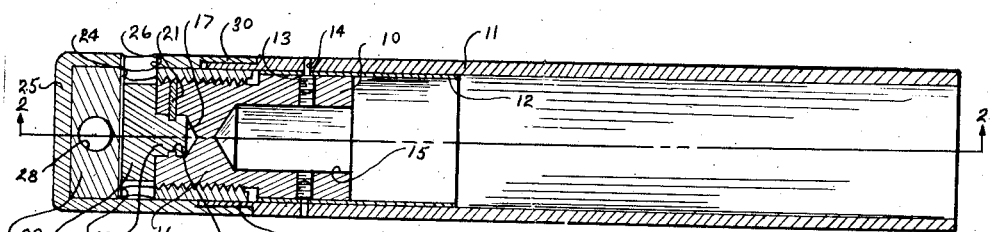
Fig. 1 is a longitudinal, vertical, sectional view of the invention.
Figure 2:
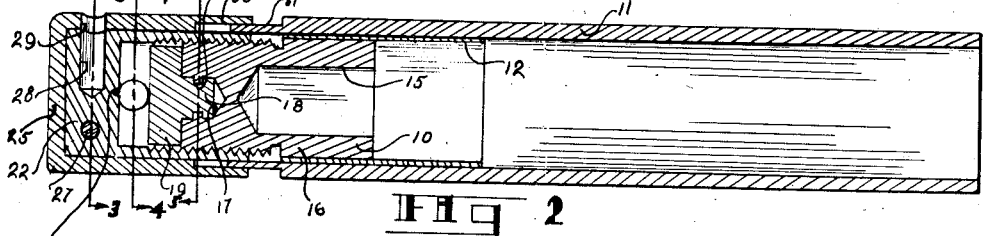
Fig. 2 is a longitudinal, central, sectional view taken on line 2—2 of Fig. 1.

In the drawings, I have illustrated the invention embodying a handle 11 formed of suitable insulating material, such as plastic, fiber or the like. Lining the forward end of the handle 11 is a metal tube 12 in which is positioned the rear end of a thrust member 10 formed from suitable electrically conducting material, such as brass or the like. Set screws 13, accessible through the openings 14, are carried by this member 10 which upon being threaded outwardly serve to clamp the member 10 within the metallic sleeve 12. It is believed obvious that, if desired, the metallic sleeve 12 may be eliminated and other means of securing the member 10 in the handle resorted to. For instance, the member 10 might be forced into the handle 11 as a press fit or the handle 11 might be screwed to the part 10. Formed in the rear end of the member 10 is a socket 15 in which the end of an electric conductor or cable is projected and suitably secured in contact with the member 10. This member 10 is provided with the threaded forward end 16. Projected inwardly from the forward end of the member 16 is a socket 17 in which engages a stud 18 projecting from the rear face of the wear plate or engagement member 19. A peripheral groove 20 is formed in the stud 18 and a radially projected pin 21 is inserted in a radial passage formed in the member 16 so as to engage in the groove 20 so that the wear plate or engagement member 19 is rotatable relatively to the member 16 and substantially fixed axially thereof.

The member 10 may be called the male portion of the clamping mechanism which is complementary to a female portion 22 which is formed cup-shaped at one end and internally threaded so as to thread onto the portion 16 in telescoping relation. It is preferred and desired that the socket 15 be projected into the member 10 a sufficient distance so that when the member 20 is threaded onto the portion 16 a sufficient distance for clamping an electrode, the member 22 will overlie a portion of the socket 15, thus bringing the member 22 into close approach to the cable which is contained within the socket 15. Formed through the cup-shaped portion of the member 22 are diametrically opposite openings 23 and 24. Embracing the cup-shaped member 22 so as to form a cover therefor is a cup-shaped covering 25 formed from suitable electric and heat insulating material, such as fiber and asbestos composition or the like. An opening 26 is formed in the member 25 adapted to register either with the opening 23 or the opening 24.

A pin 27 of insulating material serves to retain the cup-shaped member 25 in position on the female portion 22. Extended into the base of this cup-shaped member 22 is a passage 28 registering with an opening 29 formed in the cup-shaped covering 25. The open end of the cup-shaped covering 25 is under cut as at 30 and the end of the handle is over cut or reduced in size as at 31 so that these portions may telescope as shown in Fig. 1. In use, after the parts have been assembled as shown in Fig. 1, the part 22 with the covering 25 attached thereto is rotated relatively to the remaining structure so that the base 22 of the cup-shaped member will withdraw from the wear plate 19 to provide a space between the wear plate 19 and the inner face of the base of the member 22. An electrode may then be inserted through the openings 24 and 26 so as to lie between the inner face of the base of the cup-shaped member 22 and the opposed face of the wear plate 19. The openings 24 and 26 are formed so that they slightly intersect with the plane of the inner face of the base of the cup-shaped member 22. Formed in the inner face of the base of the cup-shaped member 22, diametrically of the openings 24 and 26, is a groove 30c. The electrode clamped against the base therefore will be engaged by a conducting body throughout the diameter of the base and throughout the diameter of the wear plate 19 as both of these parts are "alive" and the opposed faces are substantially parallel to each other. The inner face of the base 22 and the opposed face of the wear plate 19 will be relatively stationary during the clamping action.

Upon relative rotation of the cup-shaped member 22 and the member 10, the electrode will then be clamped between the inner face of the base 22 and the opposed face of the wear plate 19 with the electrode lying against or within the groove 30c. When the operator inserts the rod through the openings 24 and 26, the rod may be thrust inwardly sufficiently to engage in the opening 23 so that the covering 25 serves as a means for limiting the thrust of the rod or electrode into position for use. Were an opening to be formed in the cover 25 in registration with the opening 23, the cover 25 could not thus serve as an abutment member. The operator would then use the rod or electrode which has been so inserted as a lever for rotating the female portion and the male portion of the clamping mechanism relatively to each other to effect the clamping desired. Experience has shown that were the clamping face which cooperates with the inner face of the base 22 to be made stationary relatively to the member 10, difficulty would be encountered in screwing the parts together sufficiently to effect a tight clamping on the electrode or rod. This difficulty in effecting the clamping, however, would not be as great as the difficulty which would be encountered when attempting to rotate the female and male portions of the clamping mechanism reversely for releasing pressure on the rod. Moreover, it has been found that were the wear plate 19 to be fixed relatively to the member 10, this plate would become scored and worn, resulting in imperfect operation and requiring frequent facing to remove the scorings and results of wear. However, with the mechanism shown, the plate 19, upon engagement with the rod or electrode, becomes a stationary body and the member 10 may be rotated relatively thereto serving to deliver a thrust to this wear plate 19. This permits an easy threading of the parts into clamping relation and also facilitates the unthreading of the parts so as to release the stub of the burned electrode.

In welding operations, it is desired that the electrode or rod be consumed to such an extent that the stub remaining to be discarded shall be of minimum length. It is believed obvious that the welder could not use the remaining portion of the electrode as a lever to effect reverse rotation of the male and female parts of the mechanism because of heating. Moreover, the operator could not with convenience grip the cover 25 to rotate the female portion relatively to the male portion because of heat and inability to obtain a firm grip. The operator may, after he has burned a rod or electrode and is ready for replacement, insert the butt end of the new rod through the opening 29 into the passage 28 and use the new rod as a lever for effecting rotation of the female part relatively to the male part so as to release the stub of the used electrode. When the stub of the used electrode has fallen out of the openings 24 and 26, the rod which was used as a reverse rotating lever may be inserted at its butt end through the openings 24 and 26, and the female and male portions rotated relatively to each other into clamping relation. Experience has shown that the use of the new rod as a lever for the purposes of effecting the reverse rotation renders the holder more efficient in considerably reducing the time required for removal of the stub and replacement of the same with a new electrode.

Figure 3:
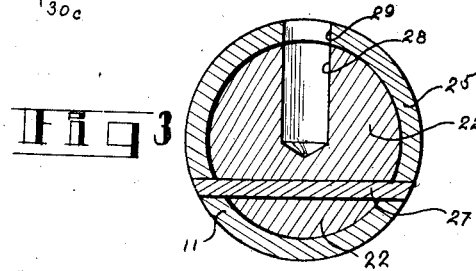
Fig. 3 is a slightly enlarged sectional view taken on line 3—3 of Fig. 2.
Figure 4:
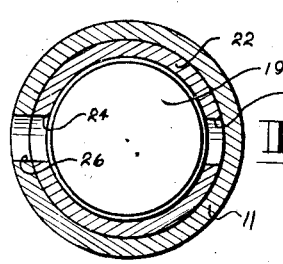
Fig. 4 is a slightly enlarged sectional view taken on line 4—4 of Fig. 2.
Figure 6:
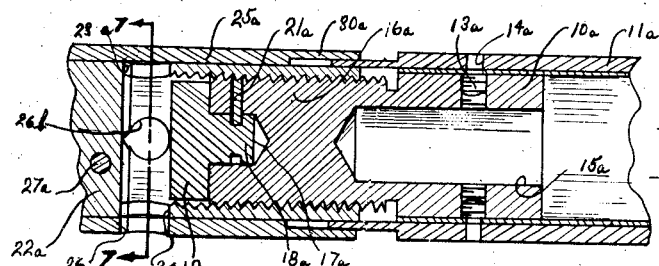
Fig. 6 is a fragmentary, sectional view similar to Fig. 1, showing a slight modification of the invention.
Figure 7:
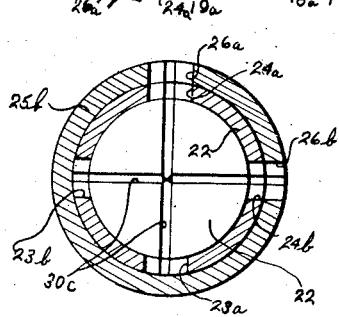
Fig. 7 is a slightly enlarged sectional view taken on line 7—7 of Fig. 6.
Figure 5:
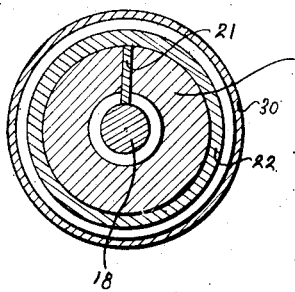
Fig. 5 is a slightly enlarged sectional view taken on line 5—5 of Fig. 2.

In Fig. 6 and Fig. 7, I have shown a slight modification of the structure illustrated in the other views. In the form shown in Fig. 6 and Fig. 7, I have eliminated the passage 28 and the opening 29 shown in Fig. 3. Formed through the cover 25b in circumferential alignment with the opening 26a is an opening 26b. This opening 26a registers with an opening 24a formed in the female portion 22. The opening 26b registers with an opening 24b formed in the female portion or cup-shaped member 22. An opening 23a corresponding to the opening 23 in Fig. 1 is also formed and diametrically opposite the opening 24b is formed an opening 23b. It is believed obvious that the openings 26a and 24a correspond with the openings 26 and 24 shown in Fig. 1 so that when the operator inserts the butt end of an electrode through the openings 26a and 24a, the electrode may be projected inwardly until it engages in the opening 23a whereupon the electrode or rod may be used as a lever for the necessary rotation for clamping purposes. When the operator desires to replace the rod with a new one, he may insert the butt end of the rod through the openings 26b and 24b. The operator may then use this rod as a lever for effecting reverse rotation and when the used stub drops out, insert the rod so used as a lever inwardly until it engages at its end in the opening 23b, whereupon this rod may be used to rotate the parts relatively to each other to effect the clamping. Thus, the electrode which is being used would project outwardly from the opening 26a and then outwardly from the opening 26b alternately. This has an advantage in that it permits the insulation and the metal parts which may have become heated at this localized point to cool while the operator is using the other localized point for welding with the new rod. The openings 26 and 24 are axially offset from the opening 29 and the opening 28. These openings are also circumferentially spaced apart. The openings 26a and 26b, shown in Fig. 7, are circumferentially spaced apart but may be said to be in circumferential alignment because they are not axially offset.

In order to replace the wear plate 19, it is but necessary to remove the pin 21.

To replace the insulating cover 25, it is but necessary to remove the pin 27. By forming the holes 23, 23a and 23b, the male portion may be used at both of its sides so that should it become worn, at one side, it may be used at the other. For instance, when the cover 25 is being replaced, it may be so positioned that the opening 26 registers with the opening 23 instead of the opening 24. Likewise, the cover 25b shown in Fig. 7 might be so positioned that the opening 26a registers with the opening 23a and the opening 26b registers with the opening 23b.

What I claim as new is:

1. An electrode holder of the class described comprising a metallic, substantially cup-shaped, internally threaded member having a radial opening formed therein for reception of the butt end of an electrode; an insulating covering for said cup-shaped member and having an opening registering with the opening in said cup-shaped member; a presser member having a socket formed in one end for reception of the end of an electric conductor and threadable at its opposite end inwardly and outwardly of said cup-shaped member, said cup-shaped member being adapted, upon inward threading of said presser member, for overlying a portion of said socket; a wear plate mounted on said presser member and overlying the inner face thereof and having a face opposed to the inner face of the base of said cup-shaped member substantially parallel thereto, the inner end of said presser member having a socket formed concentrically thereof; a stud concentrically of said wear plate projecting outwardly from one face thereof and engaging in said last-named socket for rotatably mounting said wear plate on said presser member; and means for limiting axial movement of said wear plate and said presser member.

2. In an electrode holder of the class described, a metallic substantially cup-shaped internally threaded member having a radial opening formed therein at the inner surface of the base thereof for reception of the butt end of an electrode; an insulating covering for said cup-shaped member and having an opening registering with the opening in said cup-shaped member; a presser member having a socket formed in one end for reception of the end of an electric conductor and threadable at its opposite end inwardly and outwardly of said cup-shaped member, said cup-shaped member being adapted, upon inward threading of said presser member, for overlying a portion of said socket, the inward threading of said presser member into said cup-shaped member effecting a clamping of an electrode against the inner face of the base of said cup-shaped member.

THOMAS S. DONNELLY.

REFERENCES CITED

The following references are of record in the file of this patent:

UNITED STATES PATENTS

| Number | Name | Date |
| --- | --- | --- |
| 2,175,871 | Bourne | Oct. 10, 1939 |
| 2,233,618 | Leach | Mar. 4, 1941 |
| 2,282,316 | Albert | May 12, 1942 |
| 2,294,033 | Hooper et al. | Aug. 25, 1942 |
| 2,295,546 | Combridge | Sept. 15, 1942 |
| 2,317,780 | Laskey | Apr. 27, 1943 |
| 2,328,067 | Forgett | Aug. 31, 1943 |
| 2,330,931 | Stafford | Oct. 5, 1943 |